United States Patent [19]
Zaharia

[11] Patent Number: 5,886,497
[45] Date of Patent: Mar. 23, 1999

[54] CONTROL ARRANGEMENT FOR ESCALATOR OR MOVING WALK

[75] Inventor: Vlad Zaharia, Rocky Hill, Conn.

[73] Assignee: Otis Elevator Company, Farmington, Conn.

[21] Appl. No.: 451,584

[22] Filed: May 26, 1995

[51] Int. Cl.$^6$ ...................................................... H02P 1/26

[52] U.S. Cl. ........................... 318/779; 318/798; 361/23; 324/161

[58] Field of Search .................................... 318/798–799, 318/778, 779, 567, 569; 361/23, 28; 324/160–161, 163–167

[56] References Cited

U.S. PATENT DOCUMENTS

| | | | |
|---|---|---|---|
| 3,989,989 | 11/1976 | Mayer | 318/72 |
| 4,497,391 | 2/1985 | Mendelsonn et al. | 187/29 |
| 4,622,551 | 11/1986 | Kupersmith et al. | 340/825.06 |
| 4,837,508 | 6/1989 | Garnault | 324/166 |
| 4,856,286 | 8/1989 | Sulfstede et al. | 62/89 |
| 4,999,560 | 3/1991 | Morishima et al. | 318/779 |
| 5,049,794 | 9/1991 | Okada et al. | 318/443 |
| 5,083,653 | 1/1992 | Sakata et al. | 198/322 |
| 5,186,300 | 2/1993 | Zaharia | 198/322 |
| 5,202,540 | 4/1993 | Auer et al. | 187/101 |

*Primary Examiner*—Brian Sircus

[57] ABSTRACT

A safety control arrangement for escalators includes a detector for generating a trigger signal, and a microprocessor connected to a memory. A serial data communications bus connects the detector to the processor. The memory includes toggling and interrogating routines which permit verifying proper operability of the detector.

4 Claims, 9 Drawing Sheets

CONTROL ARRANGEMENT FOR ESCALATOR OR MOVING WALK

CROSS REFERENCE TO RELATED APPLICATIONS

The present invention is related to the following commonly-owned co-pending U.S. patent application Ser. Nos.: 08/405,475, filed Mar. 16, 1995, Detection Of Escalator Safety Circuit Component Operability by Zaharia, et al. (OT-2127) and 08/430,916, filed Apr. 28, 1995, Wireless Detection Or Control Arrangement for Escalator by Zaharia, et al. (OT-2151).

TECHNICAL FIELD

The present invention relates to control arrangements and, particularly, to safety control arrangements for escalators, moving walkways or other movers which carry passengers or cargo.

BACKGROUND OF THE INVENTION

Control arrangements for escalators typically include devices such as switches, sensors and/or other detectors that are actuated when abnormal or unsafe conditions occur. A signal generated by a detector is then detected by logic circuits or software in the main controller that stop the escalator by de-energizing the main contactors (UP or DOWN) and releasing the brake.

The safety detectors (switches, sensors, etc.) have traditionally been arranged in a series circuit (safety chain), such that actuation of any detector in the chain de-energizes the main contactors (UP/DOWN) and stops the escalator. Safety codes also typically require that some safety detectors be of a manual reset type, requiring physical intervention of a qualified person before a starting key switch is operated.

Safety detectors are typically wired to various junction boxes located in an escalator wellway. The junction boxes are connected to the main controller using a number of conductors bundled in cables.

Figure 5:
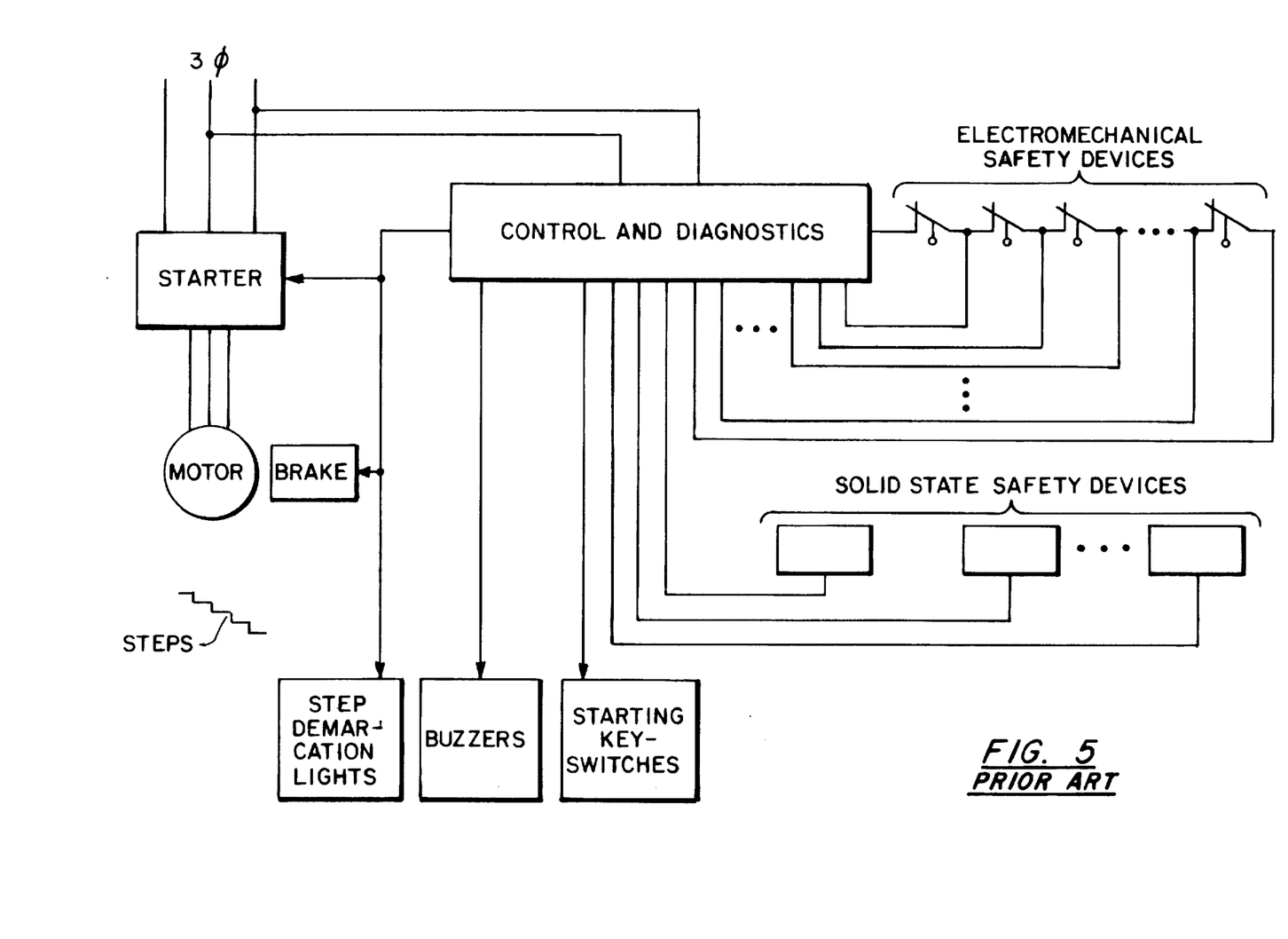
FIG. 5 is a block schematic circuit diagram of a conventional escalator having a microprocessor-controlled control system according to the prior art.

See, for example, FIG. 5, and also U.S. Pat. No. 5,186,300, Starting Circuit and Method for Escalators and Moving Walks, Feb. 16, 1993, by Zaharia. In these typical arrangements, the present inventor believes that many of the safety detectors have dedicated wiring extending from the detectors substantially to the escalator controller. For the past several years, the escalator industry has experienced many changes because of safety enhancements as well as customer demands for added features. These changes have led to a significant increase in the number of conductors, junction boxes, terminal blocks and other wiring devices. Thus, the cost of labor and materials associated with escalator wiring has increased significantly.

When diagnostic devices are used, the number of connections increases dramatically; which often adds even more to the overall cost of manufacturing the escalator.

Therefore, the cost of making an escalator increases proportionally to the number of safety devices and optional features because of the wiring of these devices and features to the escalator controller.

DISCLOSURE OF THE INVENTION

The present inventor believes that reducing the amount of wiring between the controller and the safety devices would significantly reduce the cost of manufacturing an escalator. Also, this elimination would greatly simplify the process of connecting or adding a new switch, sensor, other safety device or detector.

According to the present invention, a control arrangement includes a first detector for generating a first trigger signal, a signal communications bus connected to the first detector, a processor connected to the bus, and a memory connected to the processor. The memory includes instructions for generating a control signal responsive to a trigger signal generated from the detector and received by the processor. Preferably, the bus is a serial data communications bus (or serial link).

According to an optional feature of the present invention, non-velocity dependent detectors (e.g., those for skirt obstruction, step upthrust) are surveyed by a "toggling" or "interrogation" routine during start-up and/or motor operation. Further optional inventive features permit surveying velocity-dependent detectors during start-up and/or normal operation of the escalator. All of these routines are suitably stored in the memory, and fetched by the processor for execution. Each of these routines exercises, checks and/or surveys specific detectors to ascertain whether or not such detectors are operating properly. Another inventive feature prevents motor starting during power-up.

Accordingly, it is a principal object of the present invention to reduce costs for manufacturing electronic control arrangements.

It is a further object of the present invention to reduce cost in manufacturing escalators or other people movers.

It is an additional object of the present invention to simplify the addition/removal of safety devices or detectors to/from escalators or to/from other people movers.

It is a still further object of the present invention to survey the operability of velocity and/or non-velocity dependent safety detectors during operation of an escalator, moving walk or other people mover.

It is a further object of the invention to interrogate velocity—dependent detectors during power-ups and/or during the time period (start-up) beginning when electrical current is first applied to a motor but ending before the motor reaches full operating speed.

Further and still other objects of the present invention will become more readily apparent in light of the following detailed description when taken in conjunction with the following drawing, in which:

DETAILED DESCRIPTION OF PREFERRED EMBODIMENTS AND BEST MODE

Figure 1:
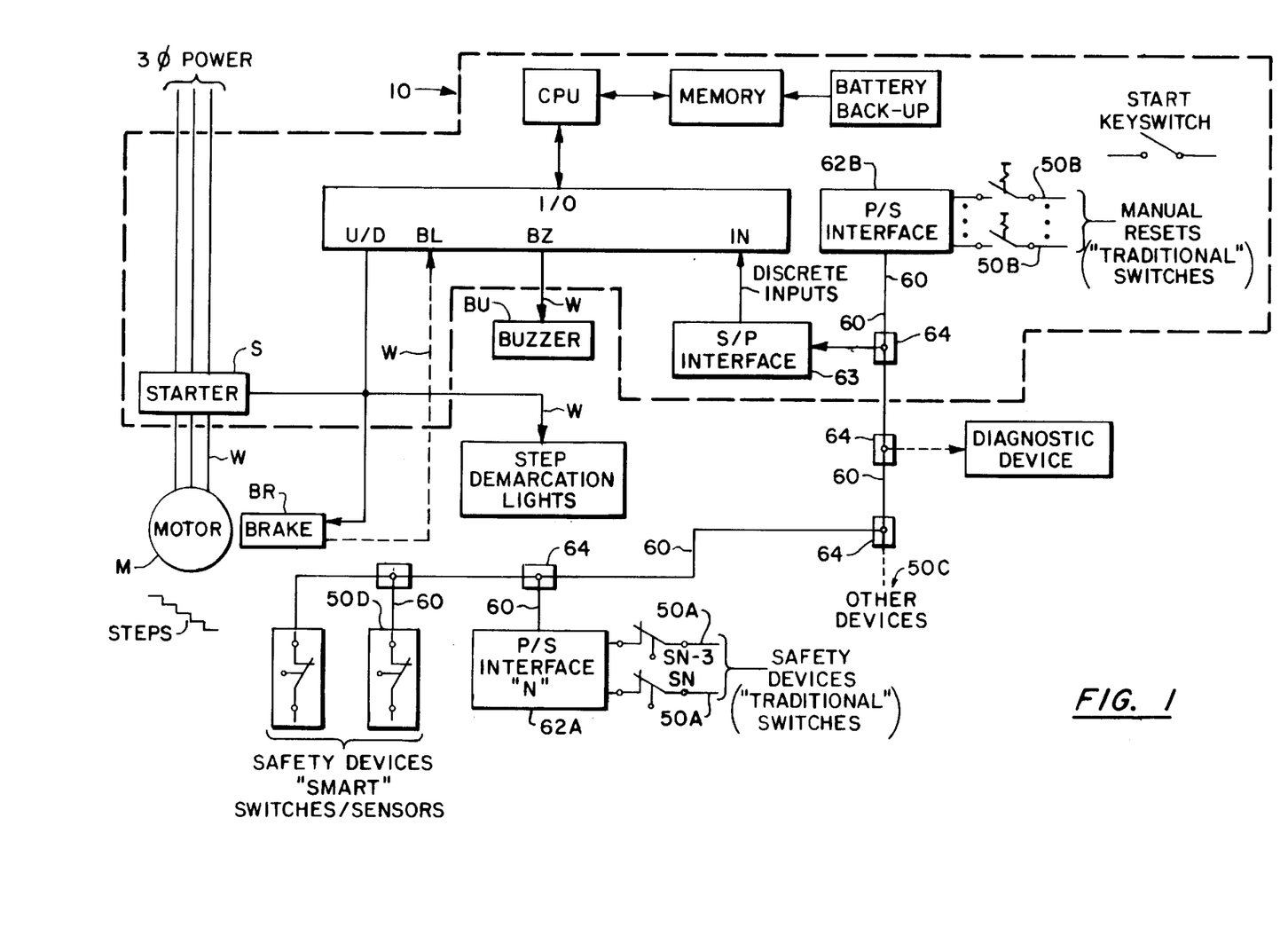
FIG. 1 is a block schematic circuit diagram of an escalator including a first preferred embodiment of a control arrangement according to the present invention.

Referring now to the figures, and FIG. 1 in particular, there is shown a first preferred embodiment of a control arrangement according to the present invention for controlling (via wires W) a motor M (mechanically coupled to, e.g., movable steps), a light L, a buzzer BU and/or a brake BR.

Figure 1A:
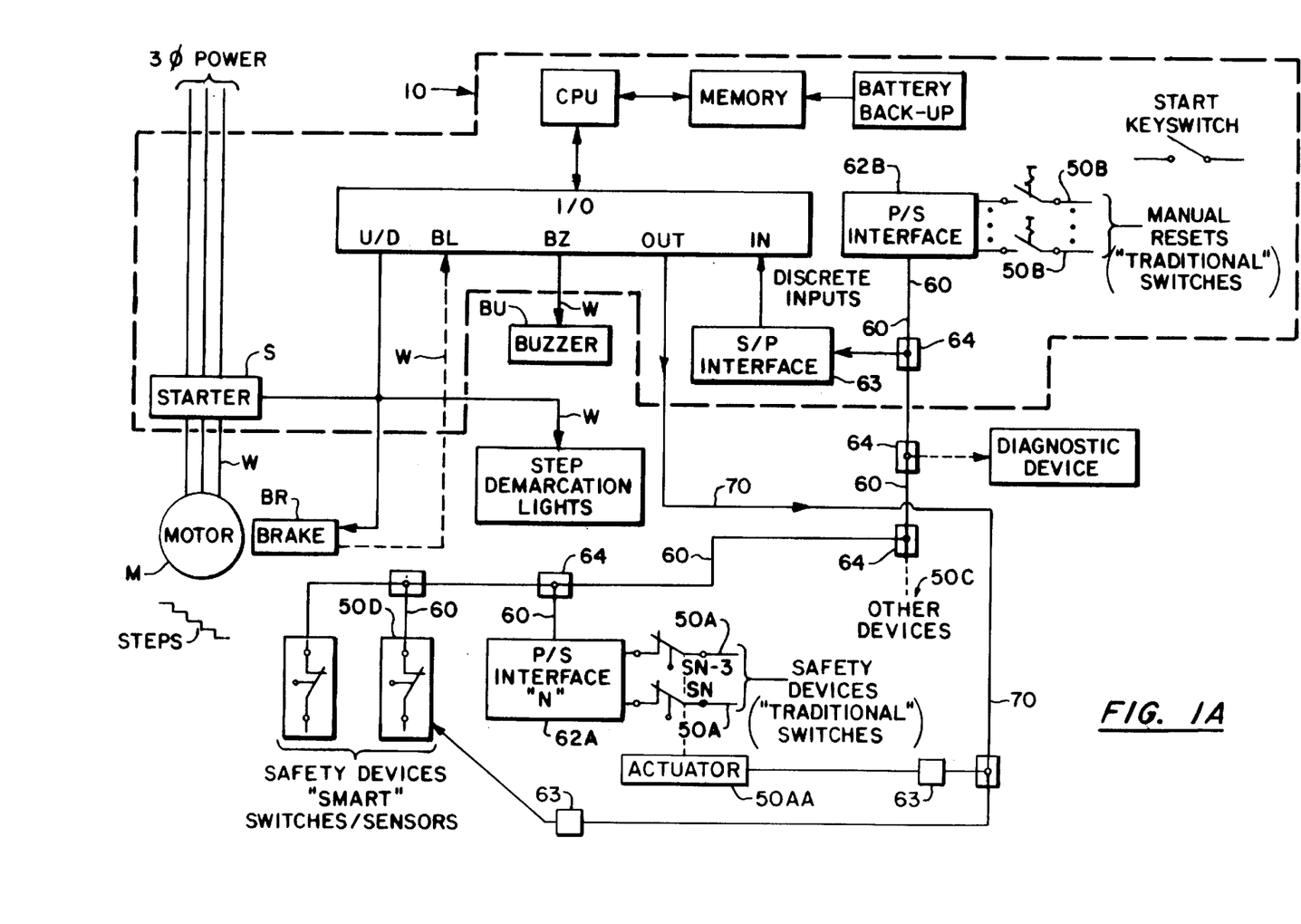
FIG. 1A is a block schematic circuit diagram of an escalator including a second preferred embodiment of a control arrangement according to the present invention.

As shown, the control arrangement includes a control unit 10 connected to a plurality of safety devices or detectors 50A, 50C, 50D via a signal communications bus 60. In FIGS. 1 and 1A, the unit 10 includes, among other elements discussed hereinafter, detectors 50B connected to a serial-to-parallel interface 63 connected to a trunk portion of the bus 60. Preferably, the bus 60 is a serial data communications bus (or serial link) as shown and described, for example, in U.S. Pat. Nos.: 4,497,391, issued Feb. 5, 1985 entitled Modular Operational Elevator Control System by Mendelsohn et al; 4,622,551, issued Nov. 11, 1986 entitled Half-Duplex Industrial Communication System by Kupersmith et al. and/or 5,202,540, issued Apr. 13, 1993 entitled Two-Way Ring Communication System for Elevator Group Control by Auer et al. which are all hereby incorporated in their entireties by reference. The bus 60 permits transmissions of data in a serial format to the unit 10 from the detectors 50A, 50B, 50C, 50D. Serial formats are well understood by those skilled in the art and need not be further discussed.

Each detector 50A, 50B is connected to a suitable parallel-to-serial interface (port) 62A, 62B which is connected to the bus 60 by means of any appropriate connector such as a T-connector 64. As shown, the interface 62A for the detectors 50A accepts inputs from a plurality of detectors 50A. The interfaces 62, 63 include known means for suitably addressing signals from/to individual detectors 50.

The detectors 50A are, for example, commercially available limit switches having solenoids with actuators (FIG. 1A) or plungers. Each of the interfaces 62A, 62B is, e.g., Part No. SDS-C1MNA-S4 manufactured by Honeywell, Inc.

The control unit 10 includes, for example, a microprocessor (CPU) connected to a memory or memories (e.g., volatile such as RAM and/or non-volatile such as ROM, EEPROM, FLASH EEPROM etc.)—only one memory being shown, and to any suitable I/O interface (port), by means of suitable buses (data, address, control etc.), all as is well understood by those skilled in the art. The I/O port includes, e.g., outputs U/D, BZ and inputs, e.g., BL, IN. The input IN is connected to the serial bus 60 by means of a serial-to-parallel interface 63 such as Part No. SDS-C1ITS-S16 manufactured by Honeywell, Inc. The connector 64 (such as Part No. SDS-3000 made by Honeywell, Inc.) permits easy (dis)connection of the interface 63 to the trunk portion of the bus 60. The output U/D is connected to the starter S (included within the unit 10), and also to the brake BR and step demarcation lights L, while the output BZ is connected to the buzzer BU, all as shown. The memory includes well known instructions and data for controlling the starter (and, thus, the motor M), the brake BR, lights L, buzzer BU responsive to suitable input signals (e.g., a start-up signal and/or a trigger signal S) received at the input IN. For example, after receiving a trigger signal generated by a safety detector 50A because of an unsafe condition such as a missing or detached escalator step (not shown), instructions fetched from the memory cause the CPU to generate control signals on the outputs U/D, BR, BU which shut-off electrical current to the motor M, activate the brake BR, and activate the lights L and the buzzer BU.

Known escalator control arrangements (including routines for various instructions and data) are disclosed, e.g., in U.S. Pat. Nos.: 5,186,300 and 5,083,653, which are hereby incorporated in their entireties by reference. Control arrangements for detection of safety component operability are disclosed in U.S. patent application Ser. No. 08/405,475, OT-2127, by Zaharia, et al, filed Mar. 16, 1995, assigned to Otis Elevator Company, which is hereby incorporated in its entirety by reference.

The control unit 10 further includes manual reset switches 50B connected to the bus 60 by means of the interface 62B. An optional battery back-up is connected to the memory (if volatile) to retain information in case of a main power failure.

Optional smart switches 50D are connected to the bus 60 and are useful for generating velocity-dependent trigger signals such as those dependent upon handrail speed—e.g., underspeed signal (logical 0) and overspeed signal (logical 1).

The control arrangement of FIG. 1 substantially reduces dedicated wiring between most of the detectors 50A–50D and the control unit 10.

Additional aspects of the present invention are shown in and described with reference to FIGS. 1A, 2, 2A, 3, 3A, 3B, 4 and 4A.

As shown in the alternative embodiment (FIG. 1A) of the control arrangement, the I/O port includes an output OUT connected to an actuator (e.g., plunger of a solenoid) of each detector 50A by means of a S/P interface 63 connected to a signal communications bus 70. The bus 70 is a serial link constructed according to the same teachings as that taught by U.S. Pat. Nos. '391 , '551 and/or '540. An appropriate signal AS which is output to the bus 70 causes the actuator 50AA, e g., either to open or to close the contacts of the appropriately addressed switch 50A.

With the configuration of FIG. 1A, the inventive routines of FIGS. 2, 2A, 3, 3A and 3B may be executed by the control arrangement of the present invention. All routines are suitably coded, and then stored in the memory.

Figure 2:
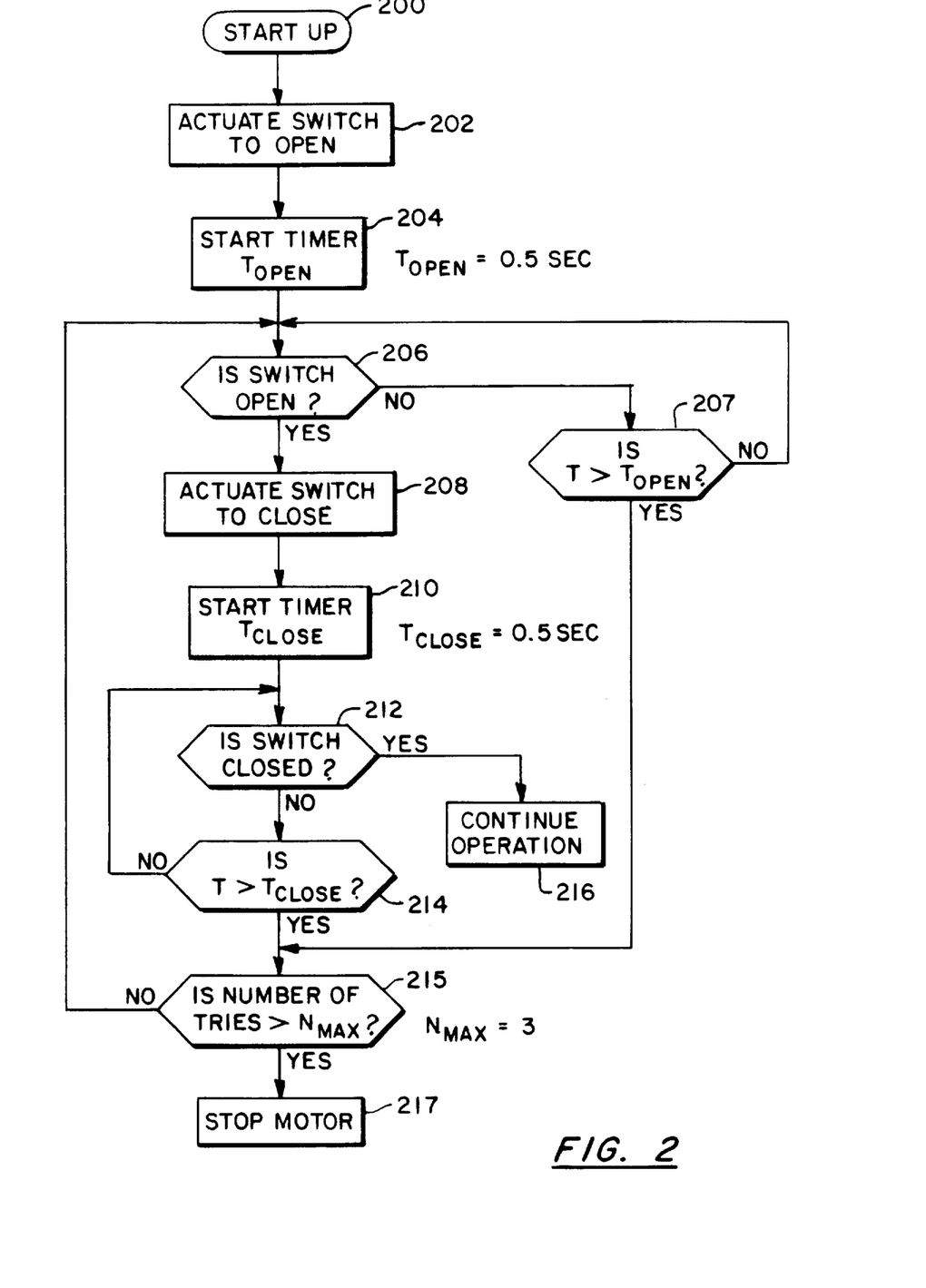
FIG. 2 is a high-level logic flow diagram of a toggle routine of the present invention for non-velocity dependent detectors during start-up.
Figure 2A:
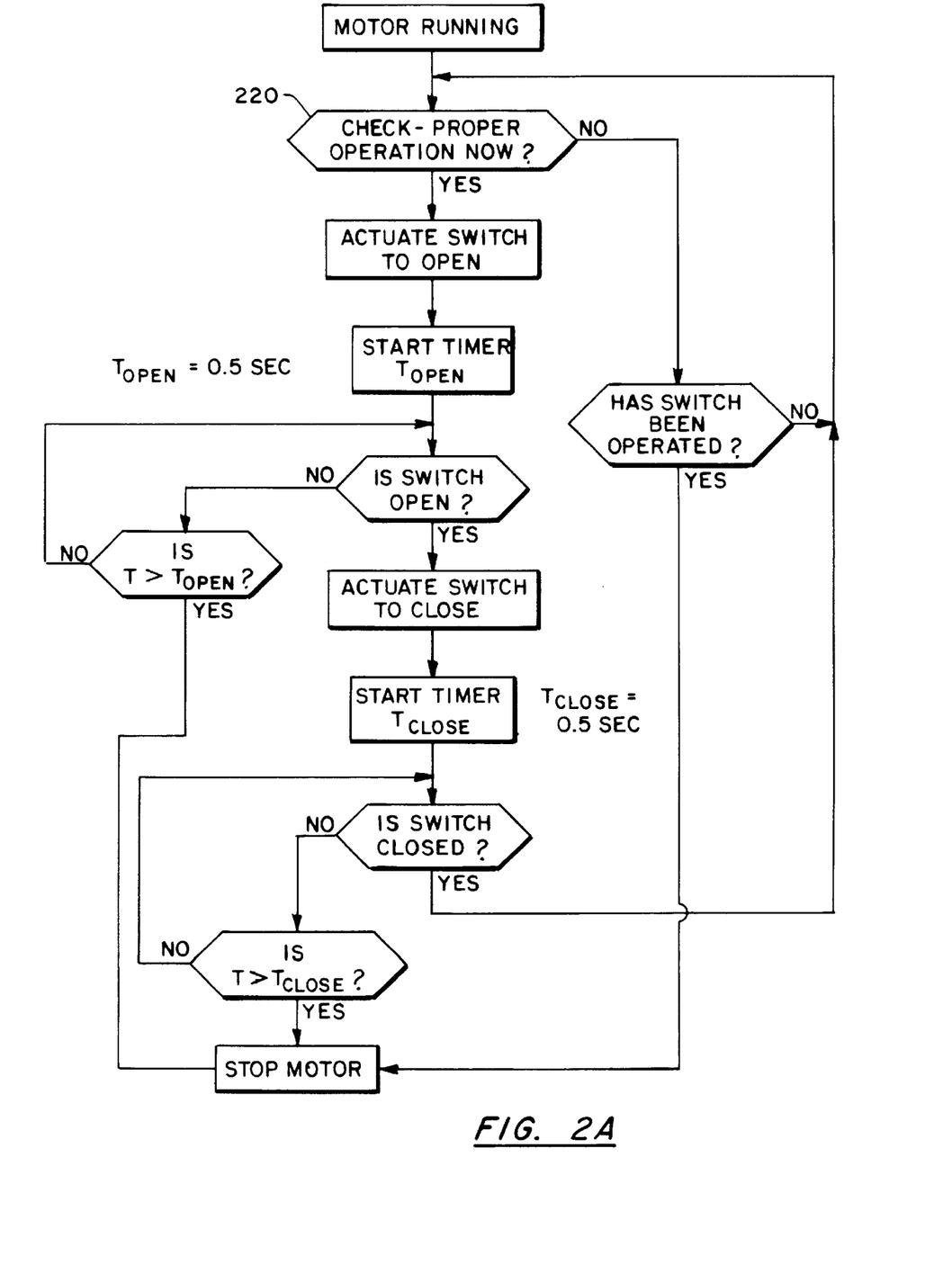
FIG. 2A is a high-level logic flow diagram of a toggle routine of the present invention for non-velocity dependent detectors during normal motor or escalator operation.

The toggle routines of FIG. 2 and FIG. 2A exercise or control non-speed dependent detectors such as traditional (e.g., electromechanical) switches 50A having actuators 50AA. The interrogation routines of FIGS. 3, 3A and 3B exercise or control speed-dependent detectors such as speed sensors/switches 50D (e.g., inductive proximity sensors). The sensors 50D, optionally, may be smart—i.e., include hardware (discrete logic circuits, processor and/or memory) and/or suitable software to provide a local intelligence and also, for example, a capability to transmit/receive addressed signals. In any event, all routines 3, 3A, 3B can be stored in the memory and executed by the CPU (FIGS. 1, 1A).

Referring now to FIG. 2, when a keyswitch is closed, the CPU controls the starter (FIGS. 1, 1A) to cause electrical current to flow to the motor M (Step 200). In a step 202, an actuation signal AS is addressed to and received by, e.g., the actuator 50AA of one switch 50A. A first timer (T), resident in software in the memory, starts (step 204). In a step 206, a signal addressed and transmitted from the switch 50A and received through the terminal IN via the bus 60 is sensed (or examined) by the CPU—e.g., logical 1=switch closed, logical 0=switch open. If NO in the step 206, is T greater than T open (e.g., 0.5 seconds)—step 207? If NO, return to the step 206. If YES, is number of tries greater than N max. (step 215)? N max. is, for example, three. If YES, stop the motor (step 217)—and, e.g., indicate an abnormal condition. If NO, return to the step 206. If the switch 50A is now open, actuate the switch to close (step 208)—instructions executed by the CPU cause generation of a second AS signal on the bus 70 to command the actuator 50AA to close the switch 50A. A second timer (T) resident in software in the memory starts (step 210). Is switch closed (step 212)? If YES, continue operation (step 216), and permit the motor to reach normal operating speed which causes, e.g., the escalator handrail to move at a nominal speed, for example, 100 ft./minute. If NO in the step 212, is T greater than T close (step 214)? If YES and if YES in the step 215, stop the motor 217.

An additional routine for non-velocity detectors is shown in FIG. 2A. This routine is executed periodically (e.g., one or two times per day) by the CPU when the motor (and the escalator) are running. A step 220 results in a YES only when safety permits such as if there are no passengers on the escalator and if a predetermined time period since the last check has elapsed.

Figure 3:
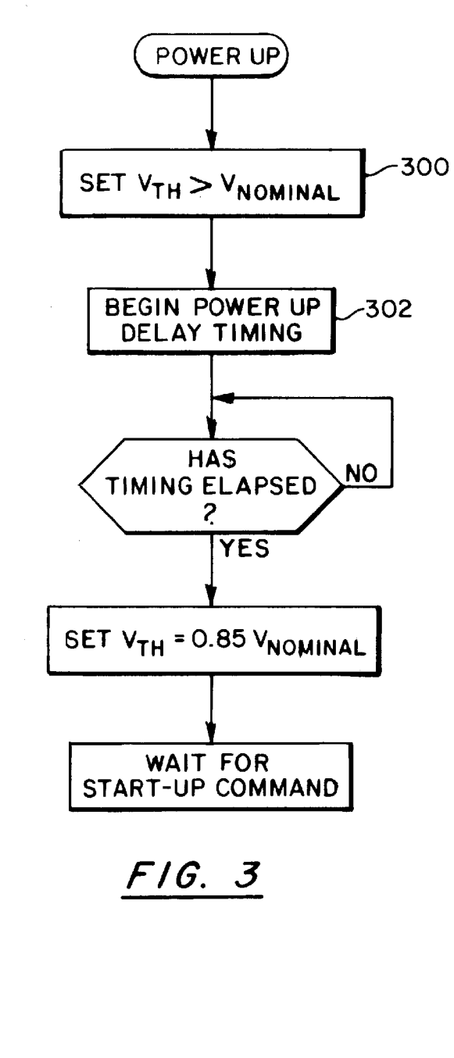
FIG. 3 is a high-level logic flow diagram of a time-delay safety routine of the present invention for velocity-dependent detectors during power-up—i.e., time period prior to any current flow to the motor.

FIG. 3 is time-delay safety routine which is executed during power-up. V nominal is, for example, 100 ft./min. $V_{TH}$ is set, for example, to 130 ft./min. in a step 300. Power-up delay timing (e.g., 45 seconds) is begun in a step 302. Again, the delay timing is realized by means of any suitable software instructions in the memory.

Figure 3A:
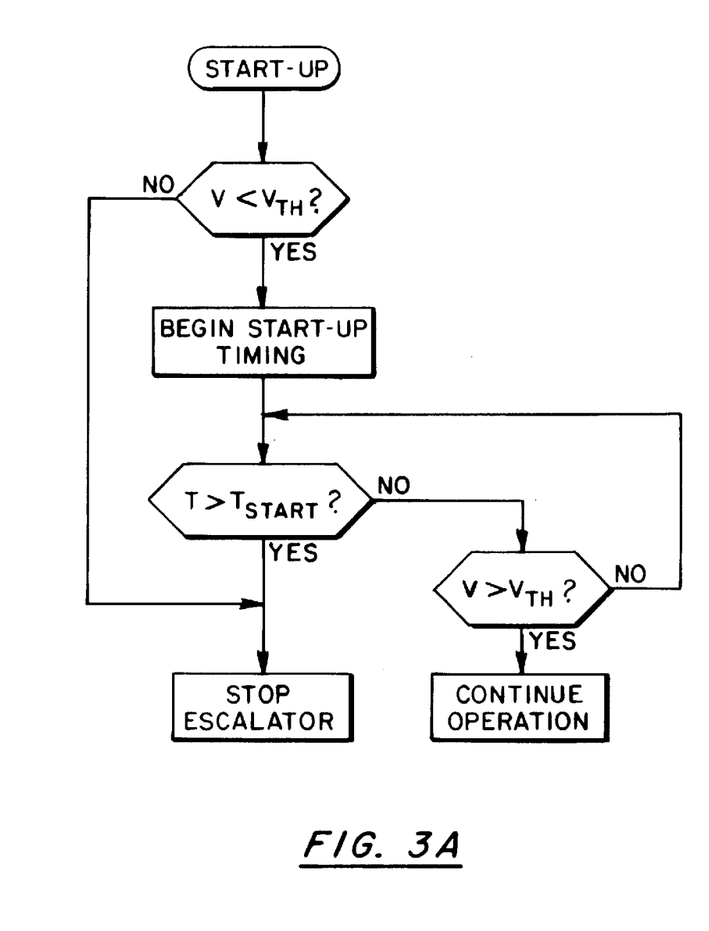
FIG. 3A is a high-level logic flow diagram of an interrogation routine for velocity dependent detectors during start-up.
Figure 3B:
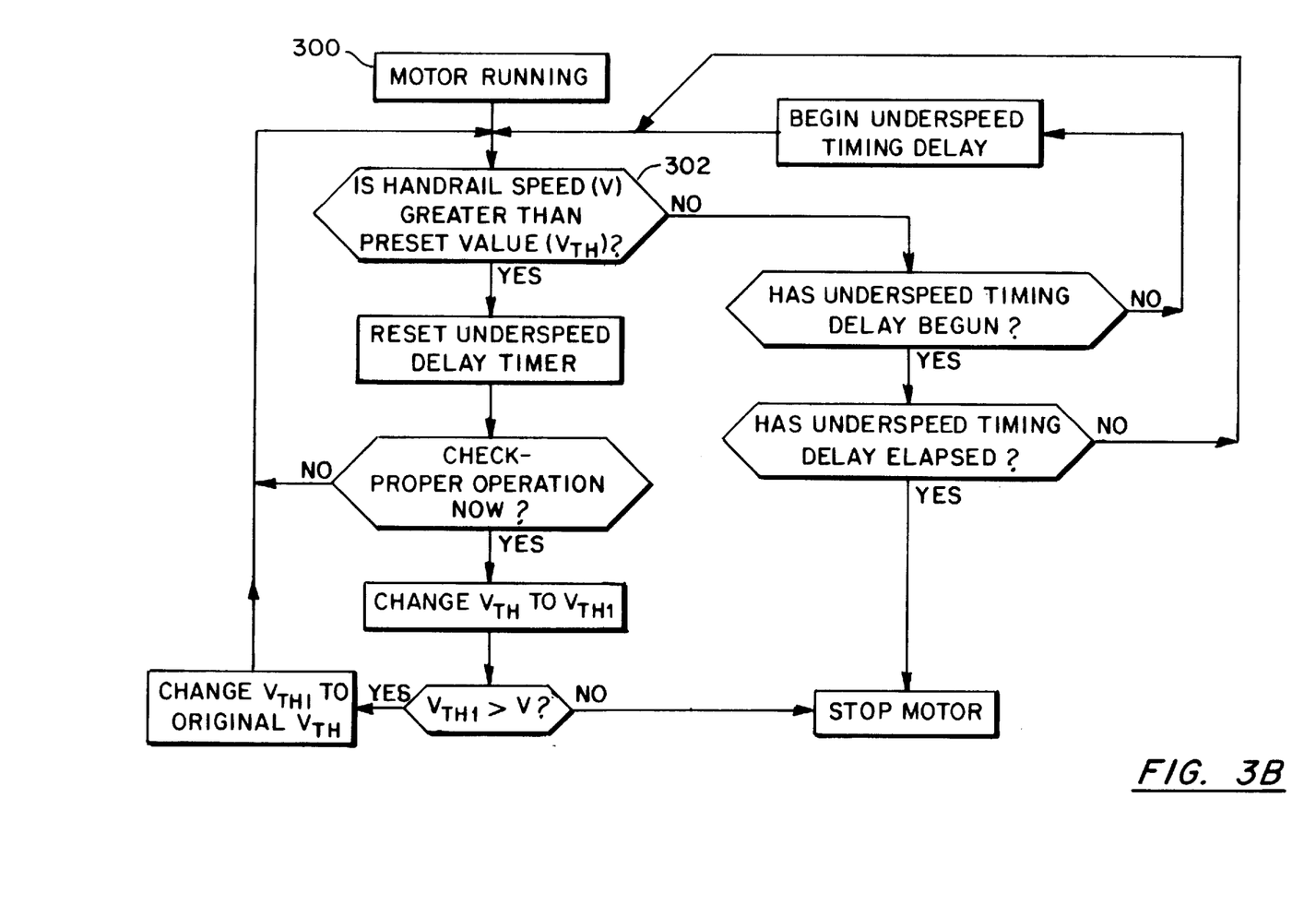
FIG. 3B is a high-level logic flow diagram of an interrogation routine of the present invention for velocity-dependent detectors during normal motor operation.

Routines applicable to speed-dependent devices while an escalator is in start-up or is running are shown, e.g., in FIG. 3A or FIG. 3B. In FIG. 3A, a variable speed V of the escalator handrail is compared to a fixed threshold $V_{TH}$. $V_{TH}$ is, e.g., 0.85 of normal (nominal) operational speed. T start is, e.g., four seconds. Start-up timing is realized in suitable software stored in the memory. As handrail speed ramps up, the actual speed V is checked against the predetermined threshold $V_{TH}$. If T is greater than T start and V is greater than $V_{TH}$, then normal operation is continued.

In FIG. 3B, a variable threshold $V_{TH}$, $V_{TH1}$ is compared to a substantially fixed speed V. As the escalator is running at a substantially constant speed above a predetermined threshold $V_{TH}$, the threshold is modified to $V_{TH1}$ for a short time to exceed the running speed, while the system determines whether the device (e.g., 50D) operates properly. An underspeed delay timer (in software) is, e.g., two seconds. During this brief check which lasts a small fraction of a second, the known shutdown sequence for underspeed detection is disabled. This check sequence may be performed periodically, or infrequently, at those times when there are no passengers on the escalator, as determined by other devices—such as load weight or optical or other sensors or detectors. $V_{TH1}$ is, for example, 1.30 of handrail normal operational speed.

Figure 4:
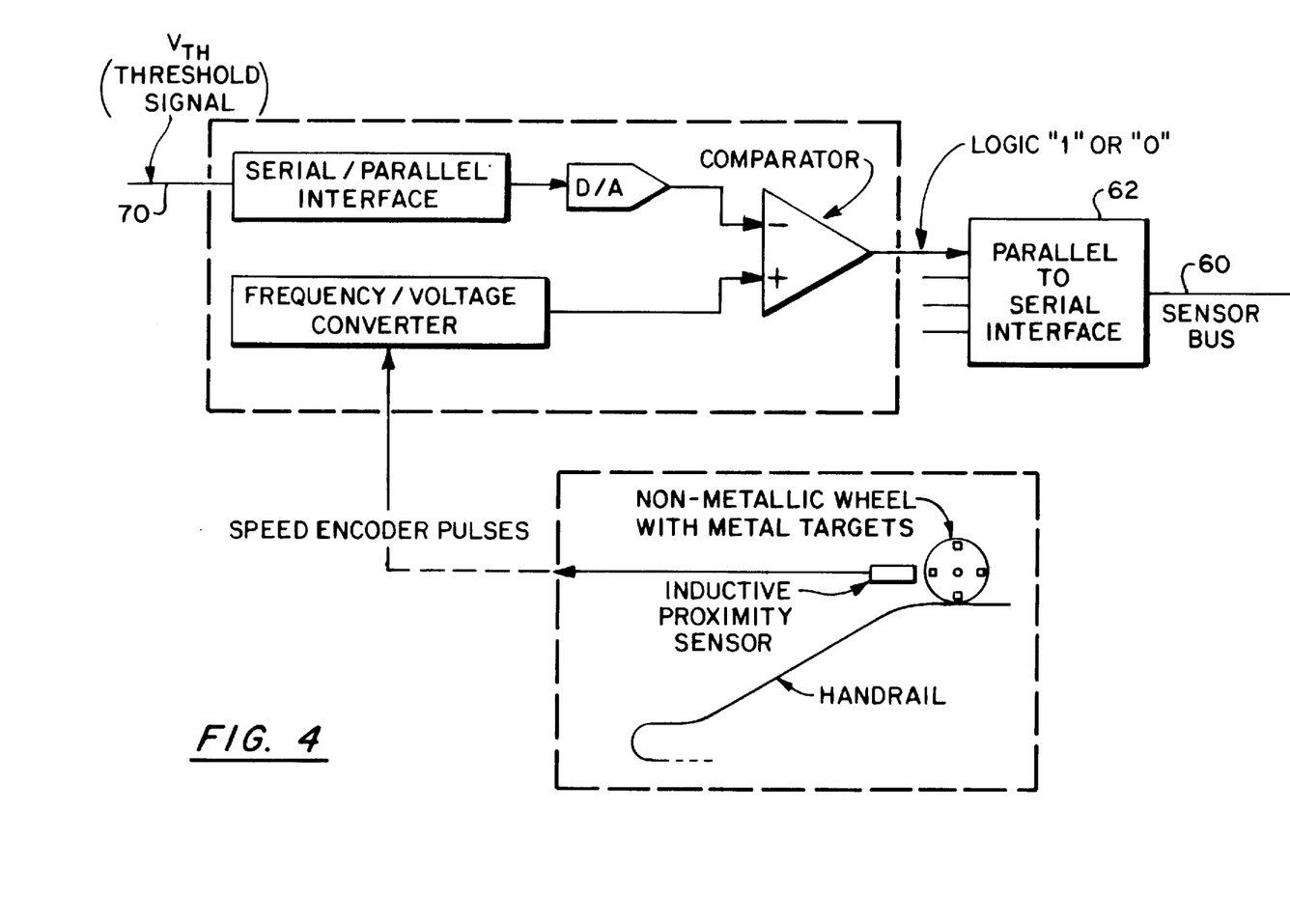
FIG. 4 is block-schematic circuit diagram of one embodiment of a velocity-dependent smart sensor.
Figure 4A:
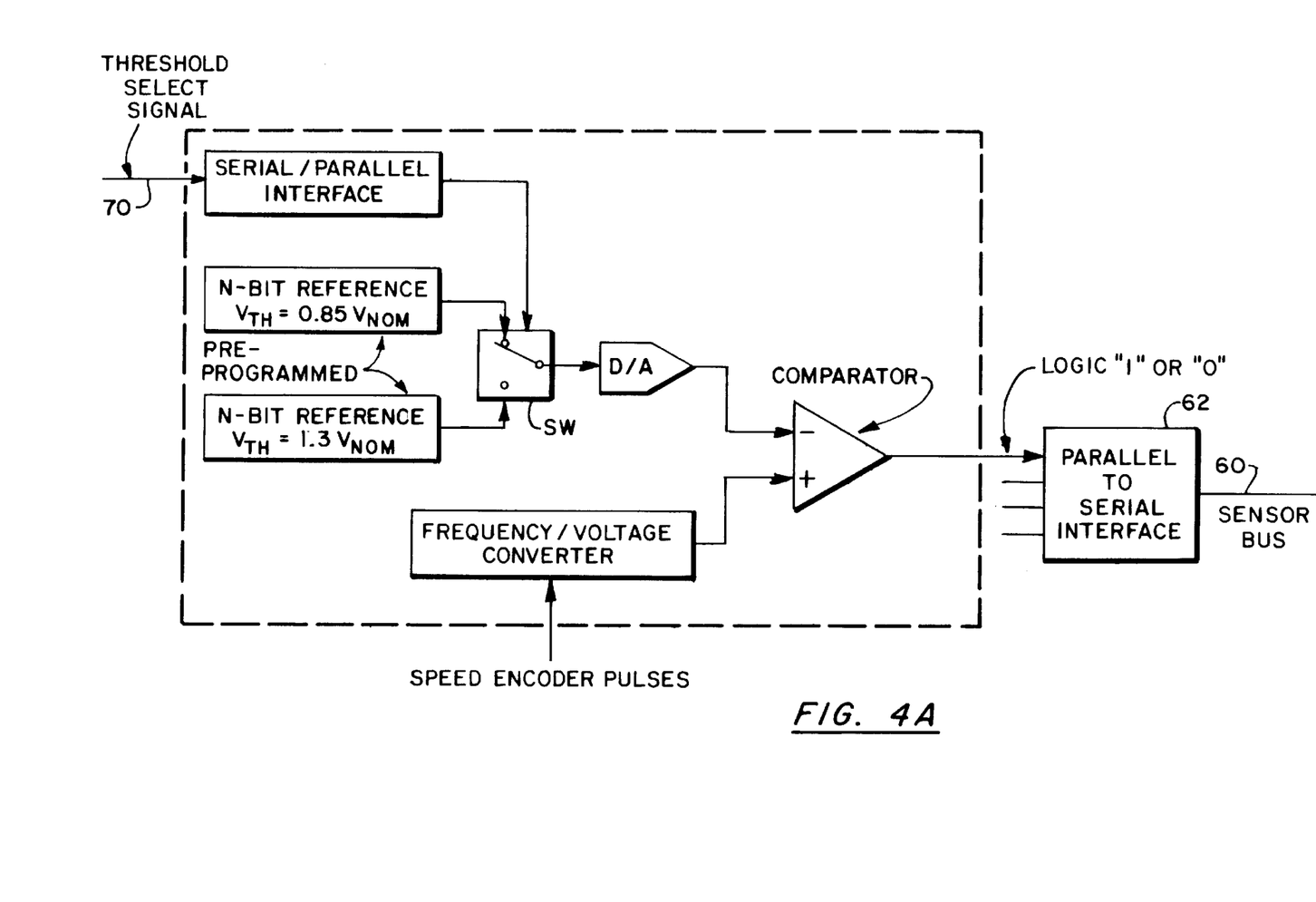
FIG. 4A is a block-schematic circuit diagram of another embodiment of a velocity-dependent smart sensor.

FIGS. 4 and 4A are block schematic circuit diagrams of several "smart" sensors 50D which may optionally be used for changing the threshold signals $V_{TH}$ to/from $V_{TH1}$. A well known non-magnetic wheel with suitable magnetic targets is coupled to a known proximity sensor which outputs speed dependent pulses (signals) to a frequency/voltage converter. In FIG. 4, a signal $V_{TH}$ or $V_{TH1}$ is output from the I/O stage, while in FIG. 4A a $V_{TH}$ or $V_{TH1}$ select signal causes the switch SW to select a threshold $V_{TH1}/V_{TH1}$ stored in a memory of the sensor 50D.

In summary, a preferred embodiment (FIG. 1) of the arrangement according to the invention includes:

Safety devices (limit switches, proximity sensors, other detectors etc.) which are no longer connected as a continuous series circuit by dedicated wiring directly to a controller, but are connected to a serial communications bus 60 (e.g., four-wire).

i. "smart" safety devices with built-in parallel-to-series (P/S) interface circuitry. These devices include limit switches or proximity sensors that can be configured to perform functions such as "ON-DELAY", "OFF-DELAY", "MOTION DETECTION", etc. This feature allows elimination of different, specialized components that are presently used in escalators (e.g., proximity sensors with built-in timers for the missing step device, proximity sensors with built-in speed monitors for the handrail-speed monitoring device, etc.), and allows the use of only one type of component to perform different functions by reconfiguring it in software.

ii. "traditional" safety devices, which require separate parallel-to-series interface circuitry.

Each safety device has its own unique address which enables the microprocessor to properly attribute status information.

Serial communication bus (SBUS) 60—e.g., four-wire, which transmits the status of the safety devices (sensors, switches, etc.).

Parallel-to-serial interface modules (P/S), which allow connection of groups of switches and sensors to the SBUS. The interface modules, as well as the switches connected to them, have uniquely assigned addresses. These modules are commercially available.

Serial-to-parallel interface modules (S/P), which allow connections of the SBUS to the I/O stage (e.g., IN and/or OUT terminals) of the microprocessor-based controller 10. These modules are commercially available.

Optional manual reset momentary push-buttons, which are connected to the SBUS by means of P/S interface modules. Manual reset buttons have uniquely assigned addresses, so that one manual reset button resets only the function with which it is associated. The manual reset buttons may also be connected directly to the I/O stage, depending on, e.g., the availability of inputs.

Optional diagnostic device (service tool), which allows access to the data on the SBUS. It is directly connected to the 4-wire bus 60. It may be handheld, portable, or fixed (part of the controller).

Quick-connect T's, which are used for interconnections on the SBUS and allow easy system expansion. These are commercially available.

As an option, a remote communications port may be added for data transmission to remote locations.

Microprocessor-based controller unit, including:
  a) Central processing unit (CPU)
  b) Memory (or memories)
  c) Battery back-up for the volatile memory, which saves critical data when the system power is turned off. Data to be saved includes the status of the safety devices, in particular those that are of manual reset type, diagnostic history, etc.

d) Input/output (I/O) stage, which receives information from the safety and operating devices and outputs signals to the starter and other devices.

e) Data, address and control busses (DBUS, ADBUS, CBUS—shown as BUS), which connect the CPU, Memory and I/O unit.

Starter, which includes contactors for direct or wye-delta starting, or solid state for smooth starting and for longer life of the electrical and mechanical components.

Controlled apparatus such as the machine motor and brake, which are operated by the UP and DOWN (U/D) signals.

Optional step demarcation lights, which are operated by U/D signals.

Optional buzzer, which is operated by the handrail-speed monitoring device and by the cover of the emergency stop button box, as required by the codes.

Although the invention has been shown and described with respect to various embodiments thereof, it should be understood by those skilled in the art that the foregoing and various other changes, omissions and additions and the form and detail thereof may be made therein without departing from the spirit of and scope of the invention. For example, the buses 60, 70 can be combined into a single communications bus.

What is claimed is:

1. A control arrangement, comprising:

a first detector for generating a first trigger signal;

a signal communications bus, said detector being connected to said bus;

a processor;

a memory, said processor being connected to said bus and to said memory;

a motor control unit connected to said processor;

a motor connected to said motor control unit;

means providing a speed signal proportional to the running speed of said motor;

a comparator having one input connected to said speed signal and another input connected to a threshold signal, and providing an output signal only in response to the signal at said one input being greater than the signal at said another input; and wherein said memory includes software for:

generating a control signal in response to a trigger signal generated by said detector and received by said processor, said control signal causing said motor control unit to provide current flow to the motor, detecting if said motor is running, and if it is, (a) setting said threshold signal equal to a first fixed underspeed threshold value, and (b) if there is no output from said comparator, stopping said motors but if there is an output from said comparator, changing said threshold signal to a second fixed overspeed threshold value, said second value being greater than said first value, and if there is an output from said comparator, stopping said motor, but if there is no output from said comparator repeating (a) and (b) above.

2. An arrangement as claimed in claim 1, wherein said first fixed value is 0.85 of a nominal value.

3. An arrangement as claimed in claim 2, wherein said nominal value is 100 ft./min.

4. A control arrangement, comprising:

a first detector for generating a first trigger signal;

a signal communications bus, said detector being connected to said bus;

a processor;

a command signal communications bus connected to said processor;

a memory, said processor being connected to said buses and to said memory;

a motor control unit connected to said processor;

a motor connected to said motor control unit;

said memory including software for- generating a control signal in response to a trigger signal generated by said detector and received by said processor, said control signal causing said motor control unit to provide current flow to the motor, setting a speed threshold to a nominal speed, initially comparing a speed signal proportional to the running speed of said motor against said speed threshold, and if the initial running speed of said motor is initially not less than said threshold, stopping said motor or, if the initial running speed of said motor is less than said threshold, starting a delay interval of time, and thereafter comparing the running speed of said motor to said threshold after said delay interval of time, and if the running speed of said motor is not greater than said threshold after said delay interval of time, stopping said motor, but if the running speed of said motor is greater than said threshold after said delay interval of time, allowing motor operation to continue.

* * * * *